Figure 1:
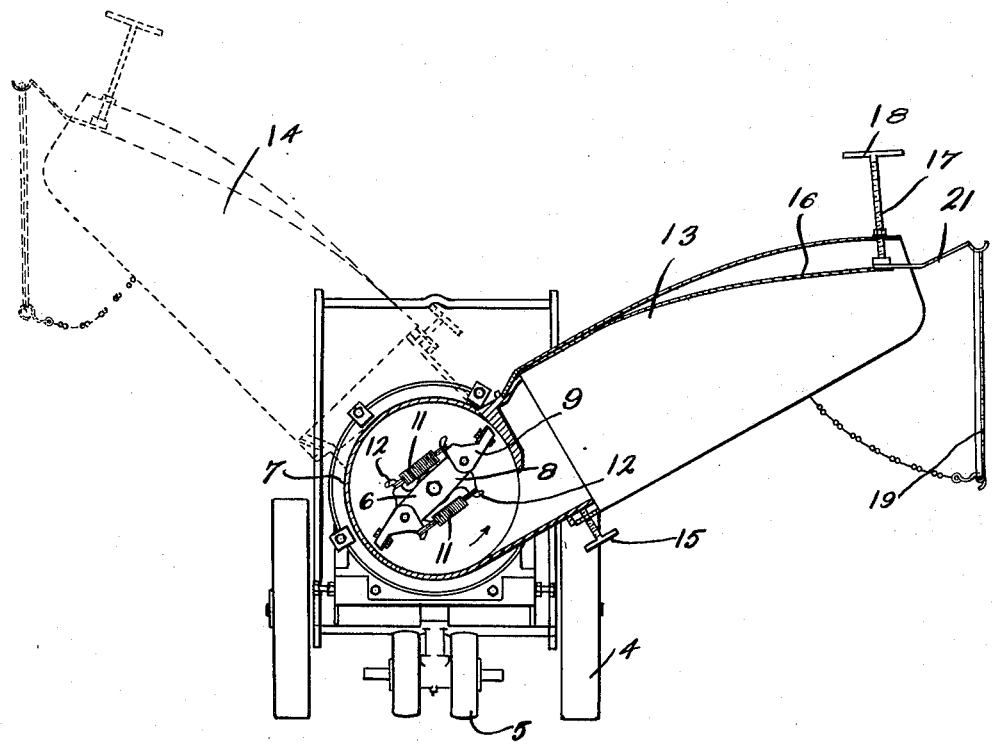

May 22, 1934.  S. L. DRYFOOS  1,959,465

MATERIAL TREATING AND HANDLING EQUIPMENT

Filed Feb. 21, 1931  2 Sheets-Sheet 1

INVENTOR.
Sidney L. Dryfoos
BY
Fay Oberlin & Fay
ATTORNEY.S.

INVENTOR.
Sidney L. Dryfoos
BY
Fay Oberlin & Fay
ATTORNEYS.

Patented May 22, 1934

1,959,465

UNITED STATES PATENT OFFICE 1,959,465

MATERIAL TREATING AND HANDLING EQUIPMENT

Sidney L. Dryfoos, Cleveland Heights, Ohio, assignor to The Universal Sand Equipment Company, Cleveland, Ohio, a corporation of Ohio Application February 21, 1931, Serial No. 517,537

5 Claims. (Cl. 259—10)

This invention relates to apparatus for conditioning materials and, more particularly, to apparatus which conditions sand and other material used in the form of particles, at the same time depositing it in a pile where wanted.

In foundries, gas works, and other industrial plants, as well as on golf courses, nurseries, or estates, it is often necessary or desirable to condition materials such as sand, oxide, compost, etc. Conditioning involves blending, mixing, aerating and generally working over the material to open and fluff the structure. This is often done by hand, the material being spread and turned over with a shovel, but such a method is, of course, costly, slow and laborious. The conditioning of the sand used in foundries for the preparation of molds is particularly important since properly prepared sand is necessary to produce castings of good appearance and smooth finish which will clean easily and reduce the cost of cleaning and grinding. In order to produce a good casting the sand which, in the ordinary course of foundry operation, has been knocked out of the flasks after having been used, requires to be properly blended with even distribution of the bond and uniformity of temper.

Another industry in which proper conditioning of materials is important is that of gas manufacture where large quantities of oxide are used to purify the gas. After having been used, this oxide contains sulphides and has also become lumpy. Before being used again it must be revivified by breaking up the lumps and thoroughly opening up the material so that reaction with the air may oxidize the sulphides and regenerate the iron oxide which is the active principle in the purification of gas.

In other lines of activity, conditions are also met with where materials must be thoroughly worked over and given a loose and fluffy structure before use. Among these may be mentioned golf courses, nurseries, and the like where compost or top dressing should be freed of lumps and generally rendered amenable to effective and uniform spreading. In all cases, it is not only necessary to condition the material being treated but it is also highly desirable that the delivery and piling of the worked-over material be under control.

It is an object of the present invention to provide an apparatus which shall condition materials of the kind described above quickly, with little labor, and at less cost than any other method now in use. Another object of the invention is to provide an apparatus which produces a better conditioned material and which will deliver this material in piles, the direction and location of which, in relation to the container, may be controlled with consequent elimination of shoveling. A further object of the invention is to provide an apparatus which is not subject to breakdowns due to foreign objects of large size entering the machine or to dust and grit finding their way to lubricated parts.

To the accomplishment of the foregoing and related ends, said invention, then, consists of the means hereinafter fully described and particularly pointed out in the claims; the annexed drawings and the following description setting forth in detail certain means embodying the invention, such disclosed means constituting, however, but one of various mechanical forms in which the principle of the invention may be used.

In said annexed drawings:—

Figure 3:
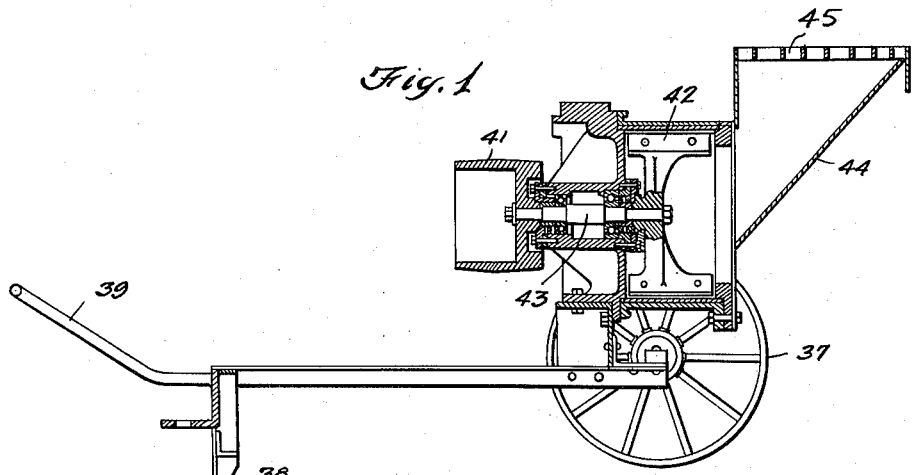
Figure 2:
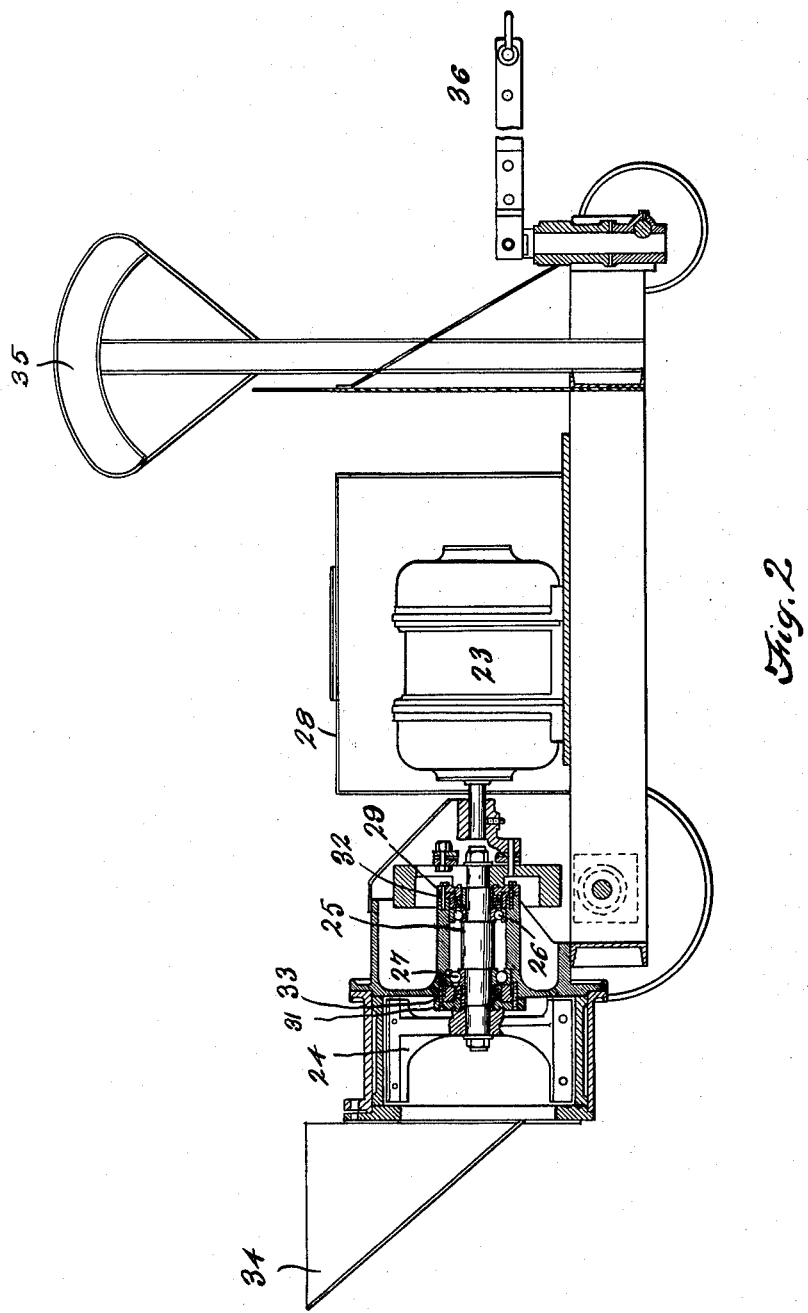

Fig. 1 is a front view partly in section of the conditioning or throwing machine; Fig. 2 is a side elevation partly in section of a modified form of my apparatus adapted for oxide conditioning; and Fig. 3 is a side elevation partly in section of still another form of my invention adapted for mixing compost.

Referring to Fig. 1 of the drawings, the conditioner is mounted on rear wheels 4 and front wheels 5 and comprises the impeller 6 which revolves in the impeller housing 7. The impeller is driven by a direct connected motor and consists of a yoke 8, to which are attached removable blades 9. These blades cooperate with the inner wall of the housing 7 and agitate sand or other material which may be fed into the housing. It will sometimes happen that large pieces of metal from the castings will enter with the sand and if the blades 9 were rigidly mounted injury to the conditioner would occur. To avoid this contingency the blades are resiliently mounted, being held in place by springs 11 which engage hooks 12 on the blades and hold these in cooperative relation with the wall of the housing 7 until such time as a large object is encountered in the material, whereupon the springs 11 permit the blades to withdraw from the housing wall and the object is passed out without effecting any injury to the apparatus.

When the material has been whirled around and loosened up by the action of the impeller blades, it is ejected from the housing through a chute 13 which is revolubly mounted on the impeller housing so as to have a traverse in a vertical plane of at least 90° of arc, although this may be increased if desired, by slight changes in the mounting of the housing without departing from the scope of the invention. The chute may, for instance, be swung over to the position 14 shown in dotted lines or may take any intermediate position. The chute is also revoluble about its own axis and thus may be reversed so that the same wall of the chute is always uppermost whatever the position to which the chute may be swung. The chute is kept from further rotation on its own axis by a set screw 15 which locks the chute on an extension of the impeller housing. This construction permits sand or other material, after being conditioned, to be thrown and piled at varying distances from the machine and also permits the material to be thrown up into a bin above the floor level. This ability of the container to throw the material in the direction and to the distance desired does away with the necessity for much shoveling by hand.

In addition to the revolubly adjustable chute 14, a further means for directing the flow of a stream of said material is provided in the form of a baffle 16 which is located in the upper part of the chute and may be raised or depressed by means of the screw 17 having a handle 18. A screen 19 depends from a hook 21, the latter being attached to the baffle 16 so that adjusting the baffle results automatically in the screen being raised or lowered therewith. It has been pointed out above that the chute is reversible about its own axis and consequently, the baffle 16 is maintainable in the upper part of the chute. It follows that the screen depending from the baffle will always be in a position such that the sand will be discharged therethrough. The function of this screen is to remove foreign matter and generally to clean the sand.

Fig. 2 illustrates a modified form of my apparatus which may be used for conditioning oxide from gas plants, but which is similar to the apparatus shown in Fig. 1 in many respects. This view shows a motor 23 which revolves the impeller 24 through the drive shaft 25. The drive shaft is mounted in bearings 26 and 27. In view of the extremely dusty conditions which will naturally be encountered where my apparatus is used, it is necessary to enclose parts which would be injured by such dust and there has been provided therefore, a housing 28 which encloses the motor. For the same purpose, the drive shaft bearings have been carefully protected by means of glands 29 and 31, together with felt retainers 32 and 33. This packing adequately excludes all dust from the bearings.

Material is fed to the machine through the hopper 34, is conditioned and ejected by the impeller 24 and is then passed out through a chute similar to that shown in Fig. 1. Where no foreign objects are likely to be encountered the blades may be of solid construction. The apparatus shown in Fig. 2 is portable and is provided with a cable support 35 to keep the feed line to the motor from interfering with the movement of the conditioner. A handle 36 is provided through which the conditioner may be moved from one position to another. It will be understood that Fig. 2 presents the motor, hopper, drive shaft, bearings and certain other parts as they are found in the machine illustrated in Fig. 1.

The modification of my invention shown in Fig. 3 is particularly compact and simple in construction and is especially adapted for use on golf courses and the like where compost is to be handled. Wheels 37 and stand 38 support the machine, which can be moved about by hand by the handle 39. The conditioner is driven through the fly-wheel pulley 41 by means of a tractor or other convenient source of power. As in the modification shown in Fig. 2, an impeller 42 carrying a plurality of blades, is revolved on a drive shaft 43, the drive shaft bearings being carefully insulated from dust and grit. The compost or top dressing which this modification is particularly constructed to handle is fed through a hopper 44 having a grating 45 to exclude large lumps or foreign matter. This machine is also equipped with an adjustable discharge chute and may have resiliently mounted blades on the impeller if desired.

The operation of my apparatus, which may be modified to suit conditions and the material being handled, is as follows:

Referring to Fig. 1, sand, for example, is fed into a hopper (see Fig. 2), or the used molds from casting operations may be dumped directly into the machine. The sand meets the rapidly revolving impeller 6 and is loosened and the lumps broken up by the impact of the impeller blades. This action, together with the centrifugal and blast effect developed within the impeller housing, thoroughly blends and mixes the sand, rendering it uniformly moist and of the same consistency throughout. The sand is then discharged through the air in a fluffy stream, the blast effect within the container and the throwing of the sand through the air causing perfect aeration and release of gases generated in the sand during molding. A maximum amount of air is thus introduced and the sand is delivered in this condition where wanted. By regulating the direction and angle of discharge of the sand by swinging the chute 14 about the axis of the impeller, at the same time reversing the chute to keep the baffle 16 uppermost, and by raising or depressing the baffle, the sand is directed to any desired point within the range of the thrower and is delivered where wanted, thus eliminating shoveling. It is also possible by means of my apparatus to throw the sand directly into overhead hoppers or bins and also to convey sand from one floor level to another, avoiding labor charges which would otherwise be incurred. Of course, sand may also be transported from one position on the foundry floor to another by means of my sand thrower.

It may happen frequently that foreign matter finds its way into the sand, as for instance gaggers, large pieces of metal from the castings, and the like. A grating on the intake hopper will separate most of these from the sand before it enters the impeller housing but objects which pass this grating will cause no damage to the machine since the blades 9 of the impeller are especially adapted to yield when such objects are encountered so as to pass these out without damage whereupon they will be removed from the sand by the discharge screen 19. The necessary flexibility of the blades is secured by mounting these with the springs 11 which permit the blades to turn away from the wall of the housing 7, leaving a space large enough to pass the object. The blades will yield as often as the object is encountered until it is thrown out of the machine along with the sand.

It will be realized that the necessary driving mechanism for the impeller, such as the motor and the drive shaft bearings, would be quickly injured if the dust and grit which inevitably surrounds the machine during operation were permitted to have access to lubricated parts. In order to assure that my apparatus will have a long useful life without frequent replacements and repairs I have provided a protective housing 28 for the motor, as shown in Fig. 2, and have also provided an especially constructed protection for the drive shaft bearings consisting of felt retainers 32 and 33 and bearing glands 29 and 31 to hold these felt retainers in place, thus forming a labyrinth seal characterized by the doubly bent felt retainers. This construction absolutely excludes all dust and grit from contact with the bearings.

Since my conditioner is intended to be portable and easily moved from place to place or turned in position, a cable support 35 has been provided to raise the feed line where it approaches the machine so that in moving the latter the cable will not be under foot or become entangled with the mechanism.

It will be understood that the construction of my machine as particularly described above in connection with the operation of conditioning or throwing sand is also applicable, either with or without modification not affecting the scope of the invention, to the conditioning of other materials which are used in loose form, such as oxide used in gas plants for purifying gases and for loosening and fluffing compost, as on golf courses, estates and the like. In gas works the iron oxide is used to remove sulphides or other impurities from the gas and the oxide finally becomes saturated with these impurities and also forms lumps due to moisture and chemical reaction. Before a given batch of oxide may be used again it is necessary to revivify it and this requires breaking up lumps and letting air into the mass so as to oxidize the sulphides and remove these in gaseous form. To do this by hand is slow and expensive and not completely effective. On the other hand, when the oxide has passed through my conditioner all lumps are thoroughly broken up and disintegrated, leaving the conditioned material open and free so that the air blast in the conditioner and the air encountered by the oxide upon discharge thoroughly penetrates to every particle and complete revivification takes place. The labor cost in gas plants, as well as in foundries, is greatly reduced and the material placed in better condition when the herein described apparatus is used.

The modification of my invention shown in Fig. 3 has been simplified to adapt it particularly for use in the conditioning of compost and other soil dressing. It involves the same features described in connection with sand and oxide conditioners but is constructed to be readily moved by hand and the wheels have an extra wide tread to prevent damage to fairways. With this machine, compost may be easily and quickly thrown into a pile wherever desired by adjusting the discharge, or it may be loaded directly into trucks or wagons.

Other modes of applying the principle of my invention may be employed instead of the one explained, change being made as regards the means herein disclosed, provided the means stated by any of the following claims or the equivalent of such stated means be employed.

I therefore particularly point out and distinctly claim as my invention:

1. A sand conditioner comprising a hopper, an impeller, an impeller housing, a discharge tube leading from said housing, said tube being adjustable to control the direction and distance of discharge of said sand, and an adjustable baffle within said discharge tube to raise or depress the flow of sand issuing from said tube.

2. A sand conditioner comprising a hopper, an impeller, an impeller housing, and a discharge tube leading from said housing, said discharge tube being rotatable about the axis of said impeller housing and the mouth of said tube being rotatable about its own axis.

3. A sand conditioner comprising a hopper, an impeller, an impeller housing, a discharge tube leading from said housing, said discharge tube being rotatable about the axis of said impeller housing and rotatable about its own axis, and having means therein for adjusting the path of discharge through said tube.

4. A sand conditioner comprising a hopper, an impeller, an impeller housing, an adjustable discharge tube leading from said housing, an adjustable baffle located within said discharge tube, and a screen in front of said discharge tube depending from said baffle.

5. A material conditioner comprising an impeller having radially-arranged blades, a housing thereabout having a tangentially-directed outlet, an axially rotatable discharge tube leading from said outlet, a screen depending from said tube in front of the mouth of said tube, and means for maintaining said screen in front of the mouth of said tube for any position of the tube.

SIDNEY L. DRYFOOS.